(12) United States Patent
Gerdes

(10) Patent No.: US 6,519,866 B1
(45) Date of Patent: Feb. 18, 2003

(54) BELT DRIVE ALIGNMENT DETECTION DEVICE AND METHOD

(75) Inventor: Brent James Gerdes, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/762,525

(22) PCT Filed: Sep. 17, 1998

(86) PCT No.: PCT/US98/19444

§ 371 (c)(1),
(2), (4) Date: Apr. 17, 2001

(87) PCT Pub. No.: WO00/16039

PCT Pub. Date: Mar. 23, 2000

(51) Int. Cl.[7] .......................... G01B 11/26; G01B 11/16
(52) U.S. Cl. ................................. 33/645; 33/DIG. 13
(58) Field of Search .......................... 33/613, 623, 645, 33/655, 679.1, 1 B, 1 BB, DIG. 13; 116/278; 283/81, 94, 101; 73/760, 762, 767

(56) References Cited

U.S. PATENT DOCUMENTS

| | | | |
|---|---|---|---|
| 1,393,710 A | * 10/1921 | Spencer ..................... 283/101 |
| 2,590,182 A | 3/1952 | Kessler et al. ................. 74/221 |
| 2,961,770 A | * 11/1960 | Imshaug ....................... 33/623 |
| 3,139,854 A | * 7/1964 | Hedges et al. ............... 116/278 |
| 3,789,507 A | * 2/1974 | Murray, Jr. ................... 33/1 B |
| 4,249,294 A | 2/1981 | Belfiore ........................ 29/271 |
| 4,900,392 A | * 2/1990 | Bradshaw et al. ............. 33/623 |
| 6,195,904 B1 | * 3/2001 | Greer ........................ 33/679.1 |
| 6,374,507 B1 | * 4/2002 | Lehto ........................... 33/645 |
| 6,385,860 B1 | * 5/2002 | MacWilliams et al. ..... 283/101 |

* cited by examiner

Primary Examiner—G. Bradley Bennett
(74) Attorney, Agent, or Firm—Nancy T. Krawczyk

(57) ABSTRACT

A device (5) and a method for determining alignment of any component in a belt drive system (1) is disclosed. The device (5) is two sets (7, 8) of lines (9, 10) placed on separate carriers (11, 12). The second set (8) is placed over the first set (7) so that some of the lines (9, 10) are coincident. The second set (8) is secured to the first set (7) at one end of the device (5). To determine any misalignment, even minute misalignment, of the belt drive system (1) the device (5) is secured to the belt surface (6) of the drive belt system (1). The belt (4) is rotated until the device (5) is fed into a pulley (2). Any misalignement of the system (1) is visually indicated by the resulting misalignment of the lines (9, 10).

10 Claims, 3 Drawing Sheets

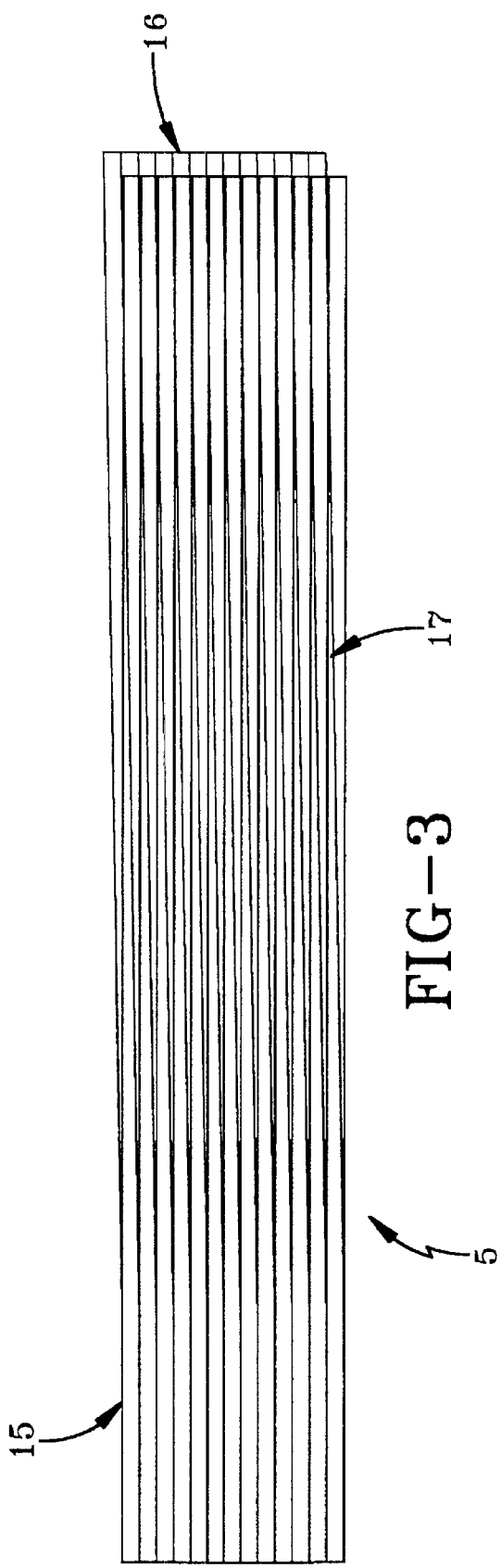
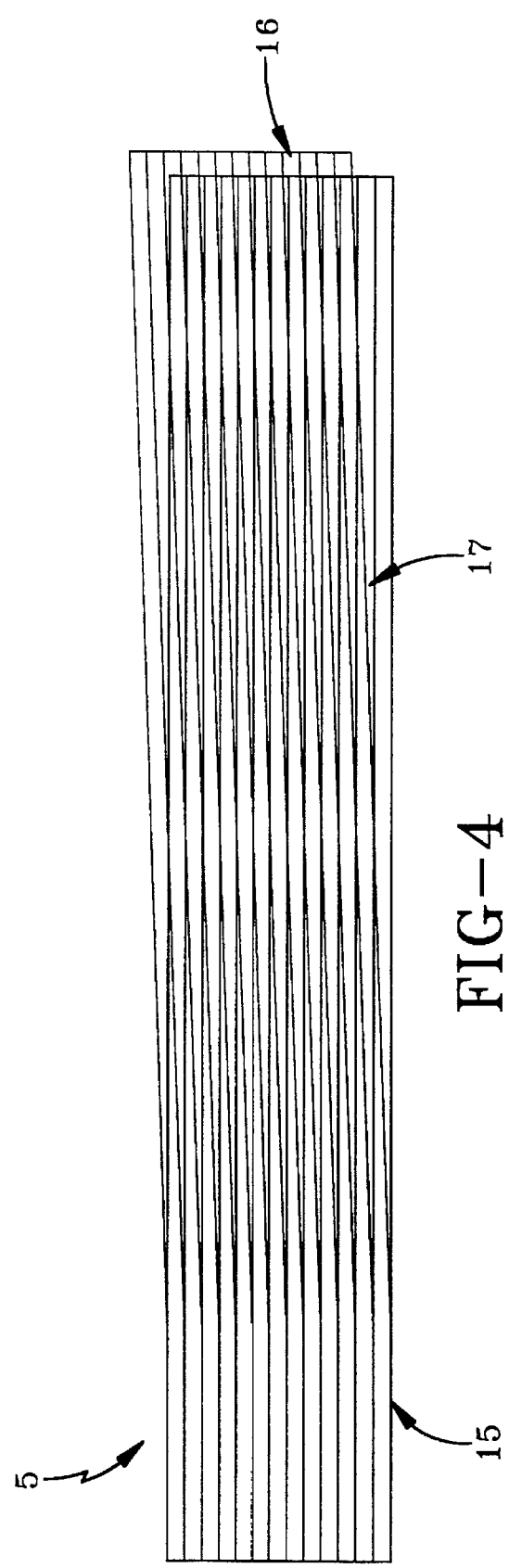

BELT DRIVE ALIGNMENT DETECTION DEVICE AND METHOD

TECHNICAL FIELD

This invention relates to improvements in belt drive systems and more particularly to systems that employ a V-belt, or multiple V-belts. The disclosed invention is directed toward an efficient way to accurately check the alignment of the components of a belt drive system.

BACKGROUND ART

Power transmission through belts or chains is most efficiently achieved when each component in the belt drive system is aligned in exactly the same plane. Misaligned tracking of the belt over the drive pulleys and any idler pulleys results in excessive belt wear. Alignment of the differing components optimizes belt drive system life.

Misalignment of the belt drive system, and the resulting non-linear movement of the belt, may be caused by a plurality of reasons. One reason is slack in the belt, generating lateral vibrations of the belt between the pulleys. This belt vibration as the belt travels about the drive pulleys often causes the belt to become misaligned between the pulleys. Additionally, if there is excessive vibration in the entire drive system, the belt may become misaligned.

Detection of initial and subsequent misalignment, even that of minute misalignment, of any component of the belt drive system can improve the life of the drive system, as well as reduce the belt drive noise.

U.S. Pat. No. 2,590,182 discloses providing a grooved idle pulley in a belt drive system to reduce lateral vibration of the belt as the belt travels between the drive pulleys. Other conventional methods to maintain alignment of the belt include providing flanges on the drive pulleys. Belts formed with longitudinal teeth grooves on the underside of the belt, corresponding to grooves in the pulleys may exhibit reduced misalignment. These methods work to maintain a general alignment of the belt between the pulleys, but do not provide a means for measuring minute misalignment of any component of the drive system.

Normal alignment procedures utilize some type of mechanical straight edge held against the pulleys or gears, for instance, a tautly pulled string or a piece of angle iron. Measurements are often taken by two people due to the cumbersome nature of the method. After the measurement is taken, the straight edge is removed, adjustments are made to the belt drive system, and the straight edge is repositioned to check the alignment. This procedure is repeated until alignment of the system is achieved.

U.S. Pat. No. 4,249,294 discloses an optical pulley alignment tool. The disclosed alignment tools consists of a first member and second member mounted on the pulleys inside the belt drive system. A target member has horizontal and vertical alignment markings corresponding to the centerline of the pulley. A viewing device having alignment markings corresponding to the markings of the target member is mounted on the centerline of the second pulley. Alignment of the pulleys is determined by any alignment of the target markings and the alignment markings of the viewing device. When the markings of the target align in the viewing device, the pulleys will be in alignment in the horizontal, vertical and angular planes.

With the tool of U.S. Pat. No. 4,249,294, if the pulleys are in alignment, the belt is presumably in proper alignment. This assumption may hold true if the toothing on the belt and the pulleys permit little to no lateral shifting of the belt. However, if the toothing grooves run across the transverse direction of the belt, lateral displacement and misalignment of the belt can still occur, absent any other mechanical device to prevent belt movement.

The disclosed invention provides a quick and efficient means for accurately determining alignment of the components of a belt drive system.

SUMMARY OF THE INVENTION

The purpose of this invention is to provide a device for ascertaining non-linear movement of an object.

A further purpose is to provide an efficient way to accurately check the alignment of the components of a belt drive system.

A further purpose of the invention is a tool for accurately checking the alignment of the components of the belt drive system.

A further purpose of the invention is to provide a means for performing quick visual checks of the alignment of the components of the belt drive system.

A further purpose of the invention is a tool for efficiently checking the alignment of the components of the belt drive system.

The disclosed invention is achieved by two sets of identical series of lines disposed on two different carrier means. One set of lines is made integral with the belt, and the second set of lines overlays the first set and is connected to the first set for a predetermined distance.

The belt and the predetermined distance of the device are fed into the pulley. The free end of the second, overlaying set of lines is free to shift with any misalignment of the drive system. Any misalignment of the any component of the belt system is quickly illustrated by the subsequent misalignment of, or interference between, the two sets of identical series of lines.

BRIEF DESCRIPTION OF DRAWINGS

The invention will be described by way of example and with reference to the accompanying drawings in which:

FIG. 3 illustrates the device when indicating a small misalignment of a component of the pulley system;

FIG. 4 is illustrates the device when indicating a larger misalignment of a component of the pulley system.

DETAILED DESCRIPTION OF THE INVENTION

Figure 1:
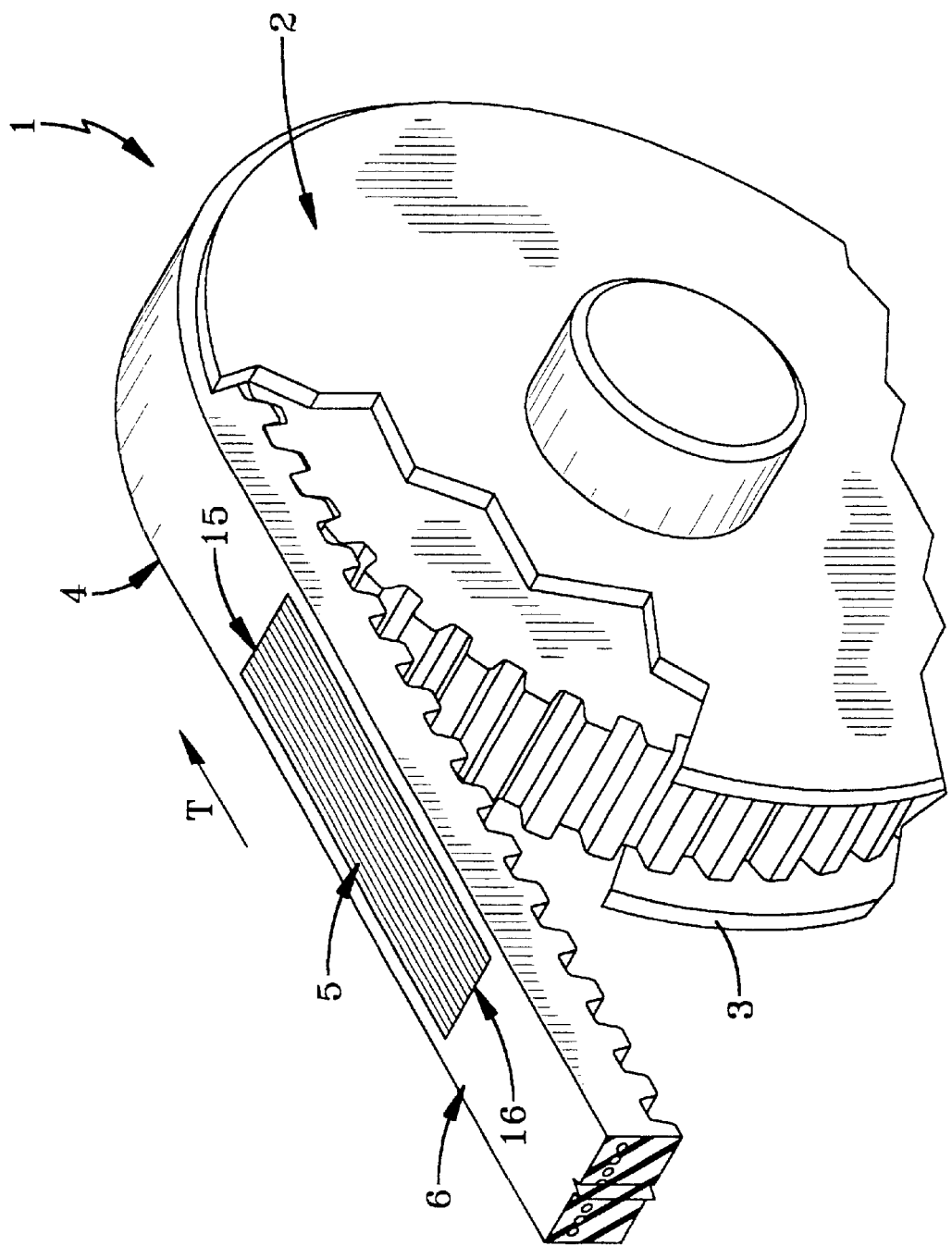
FIG. 1 illustrates a pulley and belt in a belt drive system with the attached disclosed device.

FIG. 1 illustrates a portion of a drive belt system 1. A belt 4 is wrapped about a drive pulley 2 which aides in moving the toothed belt 4 in a direction indicated by the arrow T. In a typical drive belt system 1, additional pulleys are present and the belt 4 may travel any path selected by the engineer. The illustrated pulley 2 is provided with flanges 3 to maintain positioning of the belt 4; however, not all pulleys may be provided with such flanges 3. For a drive belt system 1 to work at its optimum, all the pulleys should be in alignment and there should be no lateral movement of the belt 4; that is, each element of the belt drive system must be in alignment. Alignment of the pulleys is determined by the alignment of the centerlines of the pulleys. The belt centerline is parallel to the pulley centerline, whether the parallel centerlines are coincident or adjacent. To determine the alignment of the drive system components, the disclosed alignment device 5 is laid on the belt surface 6 in a location visible to the operator or installer.

Figure 2:
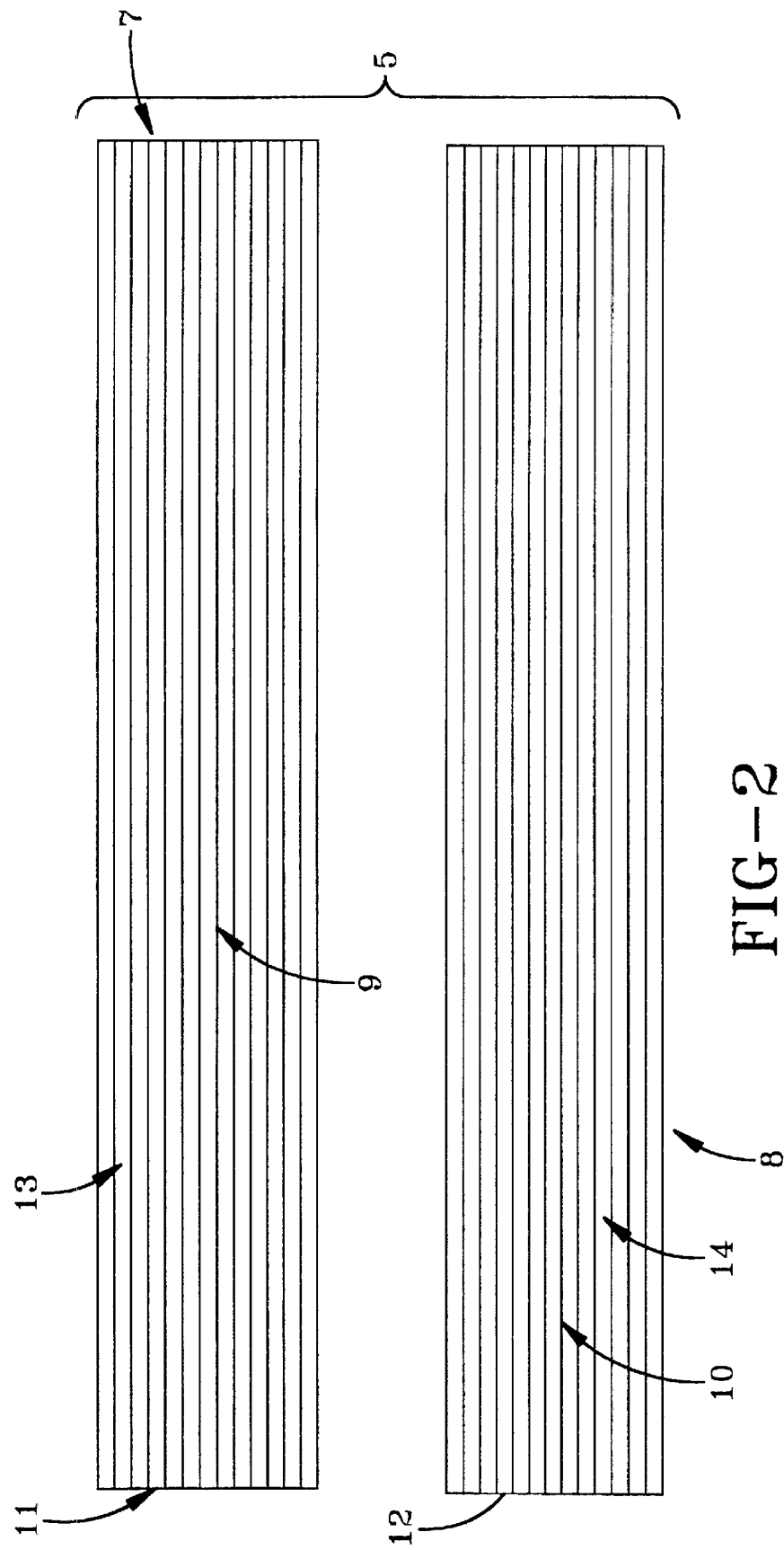
FIG. 2 illustrates one embodiment of the device.

Illustrated in FIG. 2 is one embodiment of the device 5. The illustrated device 5 is two sets 7, 8 of identical series of parallel lines 9, 10 disposed on carrier means 11, 12. The lines 9, 10 on each set 7, 8 are distanced from each other, forming spaces 13, 14 between the lines 9, 10. The width of the spaces 13, 14 is selected to provide a sufficient number of lines 9, 10 for easy visibility of the lines 9, 10 and spaces 13, 14 therebetween. Too many lines will make it harder for the operator to distinguish any misalignment in the belt drives system when using the device 5. The lines 9, 10 are distanced from each other by equal or varying amounts.

The first set 7 is the bottom set and is made integral with the belt surface 6 for measuring misalignment. The union of the first set 7 and the belt 4 may be achieved in several ways. The first set 7 may be marked as indicia on the belt surface 6, wherein the carrier 11 for the first set 7 is the belt surface 6. Alternatively, the first set 7 may be formed on a separate carrier 11, such as paper, plastic film, plastic sheet, or a metal strip, and then adhered to the belt surface 6 when an alignment determination is desired. Adhesion to the belt surface 6 can be done in a number of conventional methods such as providing clips or similar attachment means, or adhesive on the underside of the carrier 11. The simplest technique is to use a carrier 11 with an adhesive underside which secures the set 7 to the belt surface 6.

For visibility of any misalignment of a drive belt component, the spaces 13 between the lines 9 of the first set 7 may be formed in a visible color which contrasts with the color of the lines 9. In conjunction with the disclosed methods of forming the first set 7, this may be accomplished in several methods. When the set 7 is formed as indicia on the belt surface 6, the lines 9 are printed as a color which contrasts with the color of the belt surface 6, thereby creating a contrast between the lines 9 and the spaces 13. Alternatively, the set 7 may be a separate pattern printed on the belt surface 6, and the lines 9 and spaces 13 formed in any desired contrasting colors. When the set 7 is formed on a carrier 11 other than the belt 4, any set of contrasting colors which enable the lines 9 and spaces 13 to be quickly distinguished from another is permissible. An example of such a color combination is black lines 9 and yellow spaces 13. The spaces 13 may be formed in multiple colors, forming greater contrast between the lines 9 and the spaces 13.

For visibility of the lines 9 and spaces 13 of the first set 7, the second set 8 is on a transparent carrier 12 thereby forming transparent spaces 14. The lines 10 may be formed in any color other than a color used for the spaces 13 of the first set 7, ideally the lines 10 are the same color as that used for lines 9. The transparent carrier 14 may be a strip of transparent film or plastic sheet, or other similar material.

In forming the device 5 as a unit for determining alignment, the second set 8 is laid over the first set 7, with the lines 10 of the second set 8 being matched up precisely with the lines 9 of the first set 7, i.e. the lines 9, 10 are coincident, so that when viewed from overhead, it appears to be only one set of lines present. The second set 8 may be'secured to the first set 7 along a select distance forming a secured end 15. Illustrated in FIGS. 3 and 4, the length of the secured end 15 is approximately equal to 20% of the length of the device 5. The length of the secured end 15 may vary from at least 5% to 80% of the length of the device. At any selected percentage, the misalignment of any component of the drive system is still visible.

The device 5 is employed as illustrated in FIG. 1 and as described in the following manner. The device 5 is secured to the belt surface 6 as seen in FIG. 1. If the first set 7 is formed as an indicia on the belt surface 6, the belt 4 is rotated to a point where the indicia is visible to the operator. The belt 4 is driven into the pulley 2 so that the secured end 15 of the device is also driven into the pulley 2. The free end 16 of the second set 8 is free to shift with any misalignment. Any misalignment of the any component of the belt system 1 is quickly illustrated by the subsequent misalignment 17 of, or interference between, the identical series of lines 9 and 10 of the two sets 7 and 8.

FIG. 3 illustrates a small misalignment wherein the free end 16 is skewed by a small degree. The resulting misalignment 17 is visible to the operator, indicating a misalignment in the drive system 1. When the spaces 13 of the first set 7 are of a highly visible color, the misalignment 17 is quickly visible to the operator. FIG. 4 illustrates a greater misalignment of a component in the system 1 as rendered visible by the misalignment 17 of the two sets of lines 9, 10 of the device 7.

The embodiment of the device 5 in FIG. 2 illustrated identical series of equally spaced straight lines 9, 10. This is but one possible embodiment of the device 5. The criteria for the lines, in order to permit the operator to determine any misalignment in the system, is that there are, on each set 7, 8, at least several lines 9, 10 which are initially coincident when the set 8 is laid over the first set 7 prior to determining the system alignment and the configuration of the lines permits a visual indication of misalignment. Thus, the lines 9, 10 may be present several different formats such as: the lines 9, 10 may be curved in any fashion, the lines 9, 10 may be present on the carriers 11, 12 beyond the secured end 15, one set 7 or 8 may be provided with fewer lines than the other set 8 or 7.

Minute misalignment of the any component in the system that permits the belt to enter a pulley in a misaligned orientation is quickly and accurately rendered visible by means of the attached device 7. The disclosed device and method of determining any misalignment of the system will assist an operator or installer in rendering the drive system plumb to increase the life of the belt and the drive system, as well as reduce noise and improve belt drive system efficiency. The disclosed device, while described in connection with a drive belt system may be used to determine any non-linear movement of a object wherein it is desired that the object move in a linear path.

What is claimed is:

1. A device (5) for ascertaining non-linear movement of an object to which the device can be attached, the device (5) being characterized by:

a first and second set (7, 8) of lines, each comprising a series of lines (9, 10);

the first set (7) being attached to a first carrier (11);

the second set (8) being attached to a second transparent carrier (12) and the second set (8) is placed over the first set (7) in a manner capable of permitting both linear and non-linear movement between the two sets (7, 8) with some of the lines of the first set (9) and some of the lines of the second set (10) being coincident.

2. A device (5) as set forth in claim 1 wherein the lines (9, 10) of the first and second sets (7, 8) are distanced by spaces (13, 14).

3. A device (5) as set forth in claim 2 wherein the widths of the spaces (13, 14) vary.

4. A device (5) as set forth in claim 2 wherein the spaces (13) of the first set (7) are formed in a visible color.

5. A device (5) as set forth in claim 1 wherein the first carrier (11) is selected from among the group of paper, plastic film, plastic sheet, a metal strip, and a belt surface (6).

6. A device (5) as set forth in claim 1 or 5 wherein the first carrier is the surface of a belt (6).

7. A device (5) as set forth in claim 1 wherein the second set (8) is secured to the first set (7) at a first end (15) of the second set (8).

8. A device (5) as set forth in claim 1 wherein the lines (9, 10) are straight or curved.

9. A device (5) as set forth in claim 1 wherein the lines (9, 10) of each set (7, 8) extend the full length of the carrier (11, 12).

10. A device (5) as set forth in claim 1 wherein the lines (9, 10) of each set (7, 8) are configured as straight parallel lines extending the full length of each carrier (11, 12).

* * * * *